Dec. 21, 1965   C. ZELLWEGER   3,224,234
FLUID-TIGHT SEAL

Filed July 16, 1963   2 Sheets-Sheet 1

United States Patent Office 3,224,234
Patented Dec. 21, 1965

3,224,234
FLUID-TIGHT SEAL
Conrad Zellweger, Geneva, Switzerland, assignor to La Nationale S.A., Geneva, Switzerland, a corporation of Switzerland
Filed July 16, 1963, Ser. No. 295,462
Claims priority, application Switzerland, Mar. 22, 1960, 3,226/60
6 Claims. (Cl. 67—7.1)

This is a continuation-in-part of my copending application Serial No. 95,339, filed March 13, 1961, now abandoned.

This invention relates to mechanical connections of the type which provide a fluid-tight seal between two joined together elements of different materials.

A need has arisen for a means which ensures fluid-tightness between two coaxial cylindrical parts arranged one within the other. One instance where such a fluid-tight seal is required is found in gas type cigar lighters. These lighters often have a plastic fuel container subjected to high internal pressures by the fuel contained therein. They are also provided with a metallic burner valve assembly and a metallic filler valve assembly which extends through the walls of the fuel container.

Because of the high internal pressures generated by the fuels which are used and because of the variation in temperatures involved in connection with cigar lighters, it has been difficult to maintain an effective seal around each valve assembly when the fuel container is plastic. The heat, as well as aging of the plastic causes dimensional and other changes which affect the quality of seal between the plastic and the metallic elements.

According to one feature of the present invention there is provided a mechanical joint between two elements of dissimilar material which joint is extremely simple to produce and which effectively maintains a fluid-tight seal under varying conditions of pressure, temperature, aging and other ambient effects.

It has been known that in order to maintain fluid-tightness between two adjacent elements, the elements can simply be pressed together and held tightly against each other by elastic retention so as to prevent fluid seepage therebetween. This elastic manner of maintaining a pressure seal between two elements is particularly suitable where one element must move relative to another as in the case of the winding knob of a waterproof wrist watch or in the case of an adjustable valve member of a valve assembly which is mounted on a plastic lighter casing. However, it has been proven difficult to maintain sufficient elastic pressure to ensure a fluid-tight seal, especially in the case where the pressures on either side of the seal are widely different from each other and especially where slight dimensional changes due to ambient conditions and aging, result in corresponding pressure changes at the seal. The problem becomes particularly acute when one of the members, generally the plastic member, is of a structural shape which cannot resist high sealing pressures without undergoing permanent deformation.

According to the present invention these difficulties are alleviated through the provision of a novel mechanical type joint wherein an inner member is held elastically by a surrounding outer member in fluid-tight relation therewith. There is provided between the two members a protruding bead or ridge which produces a localized pressure concentration in excess of the elastic limit of the softer of the two members without distorting the member as a whole.

It has been discovered that in spite of the fact that permanent deformation takes place when materials are stressed beyond their elastic limit, so long as the ultimate strength of the material is not exceeded, it still retains elasticity; and, moreover, the retained elasticity spans a greater range of dimensional variations than that which exists under the original elastic limit of the material.

By application of this phenomenon according to the present invention, it has been possible to provide a resilient seal which can accommodate dimensional changes over the full elastic range of the materials involved, and yet which can further accommodate considerable variations in manufacturing tolerances.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

A specific embodiment of the invention has been chosen for purposes of illustration and description, and is shown in the accompanying drawings, forming a part of the specification, wherein.

Figure 1:
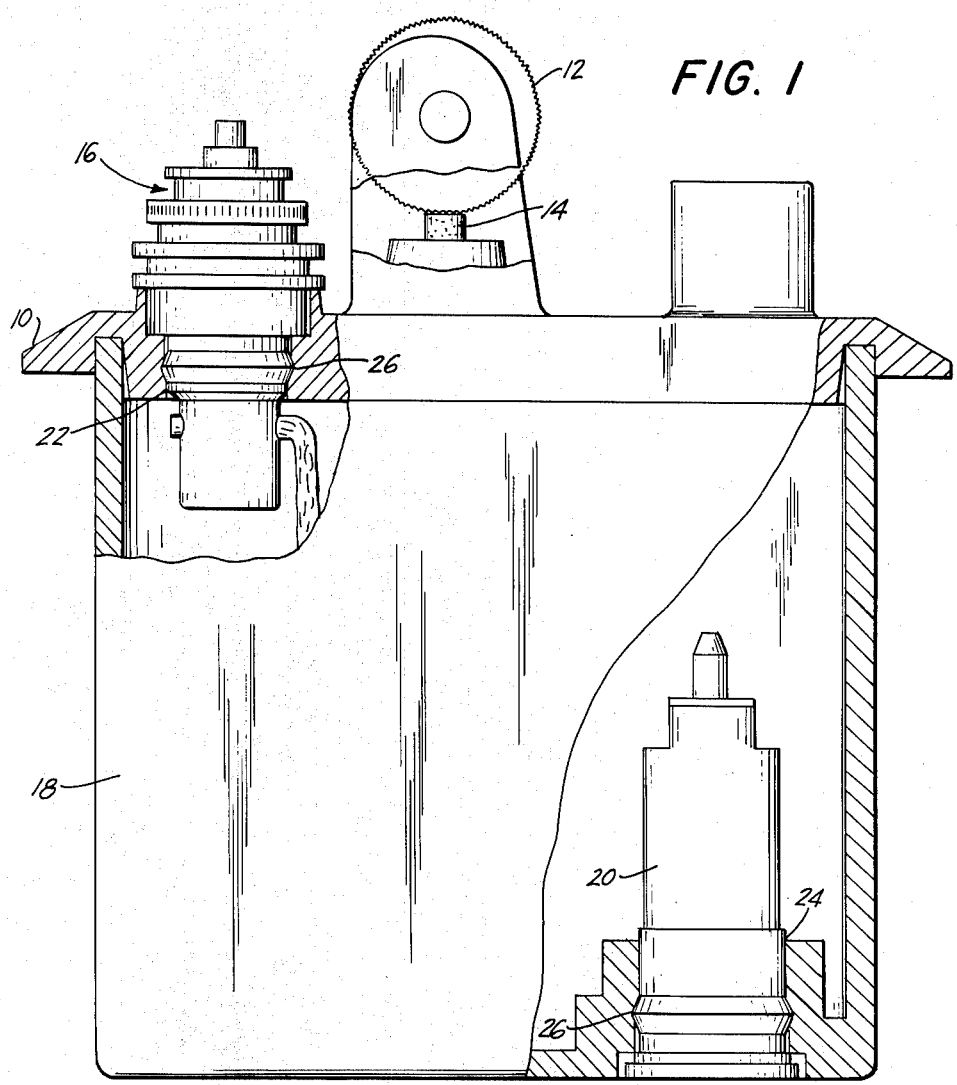
FIG. 1 is a side elevation view, partially in section, of a lighter embodying the present invention.

The lighter of FIG. 1 is of the gas burning type which burns a highly volatile fuel such as butane gas. This lighter comprises a horizontally extending top wall 10 on the top of which is mounted a sparking wheel 12, a flint element 14 and a burner assembly 16 in the usual arrangement; and below which is attached a fuel reservoir 18.

The fuel reservoir 18, as well as the top wall 10 is formed of a plastic material for purposes of lightness and economy. Plastic materials suitable for use in this connection include Nylon, Teflon, Delrin and the polycarbonates. These two items may be attached to each other by welding, heat sealing or by sealing with a plastic adhesive in well known manner.

The burner assembly 16 may take any of several well known forms, an example of which is shown in U.S. Patent No. 2,836,044 issued May 27, 1958. There is also provided at the bottom of the fuel reservoir 18, a fuel inlet valve 20. This fuel inlet valve also may take any of several well known configurations a typical one being shown in U.S. Patent No. 2,714,805 issued August 9, 1955. The burner assembly and the filling valve each extend into the interior of the fuel reservoir 18 through holes 22 and 24 provided in the top wall 10 and in the bottom wall of the reservoir 18 respectively. These valve assemblies, which are made of metal, are each provided with a cylindrical surface which fits closely but not tightly into the holes 22 and 24. They also are each provided with a peripheral ridge or bead 26 which protrudes outwardly from their cylindrical surfaces and which in assembly with the lighter itself contact the inner surfaces of the holes 22 and 24. The peripheral ridges produce a force fit between each valve assembly and its respective hole in the lighter. This force fit sets up localized and concentrated stresses in the surrounding plastic material and effects a pressure seal which prevents leakage of the high pressure contents of the reservoir out around the valve assemblies. The peripheral ridges are especially dimensioned to stress the surrounding plastic to a point in excess of its elastic limit. The significance of this extent of stressing will be explained more fully in connection with the diagram of FIG. 2.

It will be readily apparent that this form of the lighter construction provides considerable economy both from the standpoint of materials used and from the standpoint of manufacturing operations which must be undertaken. This arrangement renders practical the use of the plastic in gas lighter fuel reservoirs. Also, with the present construction, the mating parts need not be threaded or held to close tolerances. Rather they need only be provided with simple cylindrical surfaces one of which has a protruding peripheral rib. Assembly of the lighter is also simplified by means of this arrangement since all that is necessary is merely to press the valve assemblies into their respective openings in the lighter body.

When the burner and filler valve assemblies are pressed into the lighter body, the plastic material surrounding the holes 22 and 24 becomes stressed so as to undergo a permanent, plastic deformation. In this case, the plastic material behaves somewhat like an incompressible fluid and must flow when displaced. Were the entire cylindrical surface of the valve elements of the same diameter as their protruding ribs, then the amount of plastic flow produced would be so great as to cause complete distortion and even breakage of the plastic members. Also, the forces involved in assembling the lighters would become so large as to require large and expensive assembling equipment. However, by providing a concentration of stresses through the provision of a narrow peripheral ridge, the amount of plastic which must flow because of plastic deformation is small relative to the overall size of the pieces being joined. This reduces distortion and breakage and considerably lessens the amount of force required to achieve assembly. Moreover, the rib technique maintains a maximum pressure seal at least as graet as where an interference fit is produced over the entire cylindrical surface of the valve assembly.

Figure 2:
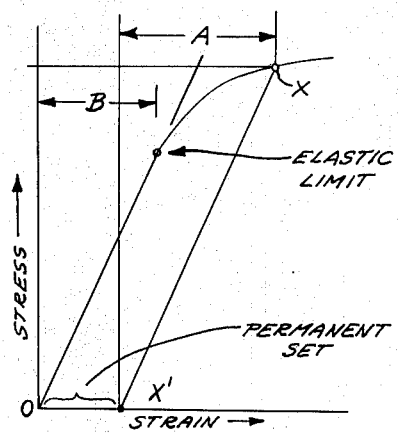
FIG. 2 is a diagram demonstrating the principles of the present invention.

The significance of dimensioning the peripheral ridge such that the plastic material becomes stressed to a point beyond its elastic limit when the parts are assembled will be appreciated from an investigation of the diagram shown in FIG. 2. This diagram shows a typical stress-strain characteristic for most plastic materials. As shown in the diagram, the stress is linearly proportional to strain up to the elastic limit of the material, and beyond this the strain increases more rapidly than the corresponding stress. If it is assumed that the plastic material has been initially stressed to the point designated as X in the diagram as by press fitting of a valve assembly; and it is then assumed that for reasons either of temperature, humidity or other ambient conditions, the plastic material thereafter undergoes shrinkage, then the material characteristic will follow the line X—X' in the diagram, this line being essentially a straight line parallel to that portion of the original stress-strain characteristic below the elastic limit. It will be noted that a certain amount of permanent set has thus been introduced into the plastic material through plastic deformation above its elastic limit, so that it has been rendered incapable of maintaining an elastic type pressure against the valve element all the way back to its original dimensions. However, it should be noted that the plastic material, when originally stressed to the point X on the diagram, in spite of permanent deformation, can nevertheless still exert elastic type stress over a greater degree of dimensional change (see distance A on the diagram) than it could had it been stressed initially only to the elastic limit, (see distance B on the diagram). Because of this, stressing beyond the elastic limit actually permits an increased elasticity whereby a greater range of dimensional variations due to temperature changes, aging and manufacturing variations can be tolerated.

According to the prior art, materials which were used to exert elastic or resilient forces, were dimensioned to be deformed to some point within their elastic limit in order to avoid the permanent deformation and accompanying loss of elasticity which took place thereabove. Although this ensured that the material would elastically accommodate dimensional variations between its original dimensions and those to which it was stressed, if the material was to accommodate the maximum dimensional variations within its original elastic range, then its original dimensional relationship with its mating part would have to be very carefully controlled. FIG. 2 demonstrates however, that in a seal according to the present invention, the initial manufacturing dimensions (which govern the exact location of X), can vary considerably, but once the material becomes initially stressed to any particular point X, above the elastic limit, it no longer is subject to the curved, partially inelastic characteristic O–X, but rather is subject only to the straight line, completely elastic characteristic X'–X. This new characteristic moreover is always parallel to and at least as long as the straight line portion of the original characteristic. Thus, maximum elasticity is exploited without the necessity for close dimensional control during manufacture.

Another important advantage of this is that the new elastic range over which the material operates is characterized by a significantly higher average stress, or sealing pressure than for the case where the material was originally stressed below this limit.

It is of course important in connection with the above described construction that the plastic material not be stressed beyond its ultimate strength for beyond this point its capacity for exerting any elastic restraint vanishes, and the only elastic sealing stress which remains is that which may be provided by the mating part. Thus, the dimensioning of the peripheral ridge must be such that the plastic material is neither cut, scored nor penetrated.

Figure 3:
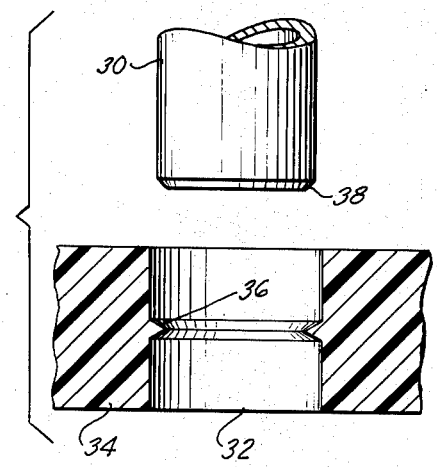
FIG. 3 shows elements according to an alternate construction prior to assembly.
Figure 4:
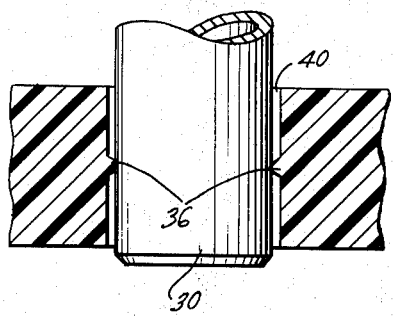
FIG. 4 shows the elements of FIG. 3 in assembly.

It is possible as shown in the arrangement of FIGS. 3 and 4 to provide the peripheral ridge in the holes of the plastic material itself instead of on the cylindrical surfaces of the valve assemblies. As shown in these drawings, a metal cylinder 30 is adapted to fit into a hole 32 in a plastic body 34 and to produce a localized stress in the vicinity of a peripheral ridge 36 in the hole, this stress being above the elastic limit of the plastic material. In such a situation, it is generally preferred to provide a chamfer 38 at the bottom of the metal cylinder so as to cause a gradual compression of the plastic rib and to prevent its shearing off. As can be seen in the assembly view of FIG. 4, the plastic ridge 36 is flattened and permanently deformed by the sides of the metal cylinder 30. Although the relative dimensions of the remaining portions of the cylinder and hole are not critical, it is necessary that they do not interfere and it is preferable that they be dimensioned with a small clearance 40 to prevent the incompressible plastic flow, which occurs in the flattening of the ridge 36, from distorting the remaining portions of the plastic member.

Figure 5:
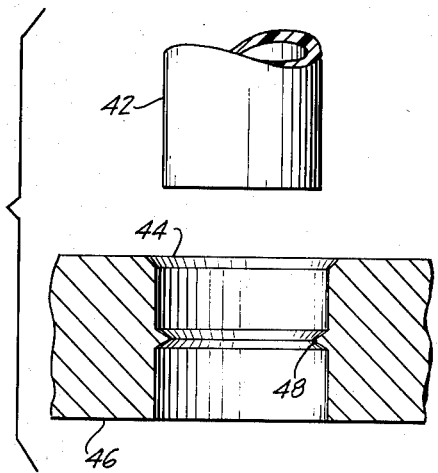
FIG. 5 shows elements according to a still further construction prior to assembly.
Figure 6:
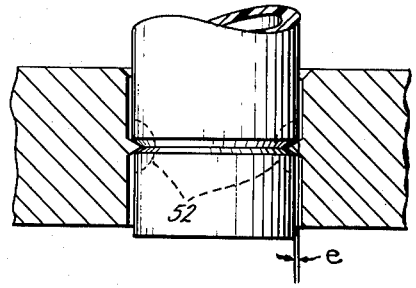
FIG. 6 shows the elements of FIG. 5 in assembly.

FIGS. 5 and 6 show a plastic-metal arrangement wherein a plastic element 42 is adapted to fit into a hole 44 in a surrounding metal element 46. The hole 44 is ringed with a protruding ridge 48 which deforms and sets up stresses in the plastic element. The ridge produces localized stresses such as is shown in the dotted line region 52 of the assembly view of FIG. 6. It will be noted that because of the permanent deformation effects produced by the metal ridge 48, the portion of the plastic element which has passed over the ridge in assembly is smaller, as indicated at *e*, than the original unstressed element.

Having thus described my invention with particular reference to the preferred forms thereof, it will be obvious to those skilled in the art to which the invention pertains, after understanding my invention, that various other changes and modifications may be made therein without departing from the spirit and scope of my invention, as defined by the claims appended thereto.

What is claimed as new and desired to be secured by Letters Patent is:

1. In a gas burning cigar lighter, a fuel reservoir of a plastic material subject to permanent deformation when stressed beyond its elastic limit and a metallic burner valve assembly extending through one wall of said fuel reservoir, said metallic valve assembly having a preformed peripheral ridge thereabout pressed radially into the plastic material of said fuel reservoir by an amount sufficient to establish local stresses in said plastic material in the immediate vicinity of said ridge to stress said plastic material beyond its elastic limit but not beyond its ultimate strength.

2. A gas burning cigar lighter comprising a top wall of a plastic material subject to permanent deformation when stressed beyond its elastic limit and having a circular hole therethrough and supporting thereabove a fuel ignition means, a fuel reservoir sealed to and closed by said top wall, a burner assembly having a generally cylindrical metal outer surface and a preformed peripheral ridge surrounding and protruding outwardly from said outer surface, said burner assembly being disposed within the hole in said top wall and dimensioned at said peripheral ridge to interfere with and strain the plastic material of said top wall in the immediate vicinity of said ridge beyond its elastic limit but not beyond its ultimate strength.

3. A gas burning cigar lighter comprising a top wall of a plastic material subject to permanent deformation when stressed beyond its elastic limit and supporting thereabove a sparking wheel and a flint element, said top wall having a circular hole therethrough, a fuel container sealed to and closed by the under surface of said top wall, a burner assembly disposed within said hole and having a generally cylindrical metal outer surface which fits through said circular hole in non-interfering relationship therewith and a preformed peripheral ridge disposed on said metal outer surface, said ridge having an outer dimension greater than the unstressed internal dimension of said hole by an amount sufficient to plastically deform the material of said wall in the region of said peripheral ridge.

4. The lighter described in claim 3 wherein said fuel reservoir is of a plastic material and further includes a filler valve having a metallic outer wall disposed within a hole in one wall of said reservoir, the metallic outer wall of said filler valve having a preformed peripheral ridge pressed into said one wall of said reservoir by an amount sufficient to cause permanent plastic deformation of the material in said one wall in the immediate vicinity of said peripheral ridge.

5. A fluid-tight assembly comprising a plastic element subject to permanent deformation when stressed beyond its elastic limit, a metallic element arranged with respect to said plastic element with one of said elements having a surface surrounding a complementary surface of the other element in non-interfering relationship, and a preformed peripheral ridge on the surface of one of said elements having an interference fit with the surface of the other element with the plastic element in the area of said ridge deformed by an amount sufficient to produce a localized stress in said plastic element in the immediate vicinity of said ridge to stress said plastic element beyond its elastic limit but not beyond its ultimate strength.

6. The assembly described in claim 5 wherein the element other than the element of plastic material and has the peripheral ridge is formed with a peripheral groove in its unstressed state into which said ridge protrudes, said groove being smaller in dimensions than said ridge by an amount maintaining plastic deformation in their immediate vicinity.

References Cited by the Examiner

UNITED STATES PATENTS

| | | | |
|---|---|---|---|
| 309,247 | 12/1884 | Patterson | 285—382 X |
| 2,340,466 | 1/1944 | Gosling | 277—178 |
| 2,535,452 | 12/1950 | Quercia et al. | 67—7.1 |
| 2,608,081 | 8/1952 | Morgan et al. | 67—7.1 |
| 2,953,398 | 9/1960 | Haugen et al. | 277—178 |
| 3,085,412 | 4/1963 | Mohr et al. | 67—7.1 |
| 3,093,990 | 6/1963 | Goddard | 67—7.1 |

FOREIGN PATENTS

| | | |
|---|---|---|
| 1,282,426 | 12/1961 | France. |
| 73,272 | 9/1953 | Netherlands. |

FREDERICK L. MATTESON, Jr., *Primary Examiner.*

EDWARD J. MICHAEL, *Examiner.*